United States Patent
Park et al.

(10) Patent No.: US 7,596,114 B2
(45) Date of Patent: Sep. 29, 2009

(54) DATA TRANSMISSION SYSTEM IN BROADBAND WIRELESS ACCESS SYSTEM USING BAND AMC AND METHOD THEREOF

(75) Inventors: Jung-Shin Park, Seoul (KR);
Geun-Hwi Lim, Seongnam-si (KR);
Hong-Sung Chang, Suwon-si (KR);
Jae-Jeong Shim, Seoul (KR)

(73) Assignee: Samsung Electronics Co., Ltd (KR)

( * ) Notice: Subject to any disclaimer, the term of this patent is extended or adjusted under 35 U.S.C. 154(b) by 369 days.

(21) Appl. No.: 11/077,854

(22) Filed: Mar. 11, 2005

(65) Prior Publication Data

US 2005/0232181 A1 Oct. 20, 2005

(30) Foreign Application Priority Data

Mar. 12, 2004 (KR) .................. 10-2004-0017097

(51) Int. Cl.
*H04B 7/212* (2006.01)
(52) U.S. Cl. .................. 370/322; 455/450; 455/451; 455/452.1; 455/452.2; 370/344; 370/431; 370/432; 375/260
(58) Field of Classification Search .......... 455/450–453
See application file for complete search history.

(56) References Cited

U.S. PATENT DOCUMENTS

| | | | |
|---|---|---|---|
| 5,875,387 A * | 2/1999 | Ayerst | 340/7.42 |
| 6,400,699 B1 * | 6/2002 | Airy et al. | 370/329 |
| 6,707,856 B1 | 3/2004 | Gardner et al. | |
| 2003/0048799 A1 * | 3/2003 | Jang | 370/431 |
| 2003/0103525 A1 * | 6/2003 | Wahl | 370/465 |
| 2004/0032354 A1 | 2/2004 | Knobel et al. | |
| 2004/0190640 A1 * | 9/2004 | Dubuc et al. | 375/260 |
| 2005/0163238 A1 * | 7/2005 | Fujii | 375/260 |

FOREIGN PATENT DOCUMENTS

WO    WO 02/49305    6/2002

OTHER PUBLICATIONS 802.16 IEEE Standard for Local and metropolitan area networks Part 16: Air Interface for Fixed Broad Wireless Access Systems Jun. 24, 2004, Oct. 1, 2004.*
802.16a IEEE Part 16: Air Interface for Fixed Broadband Wireless Access Systems—Amendment 2: Medium Access Control Modifications and Additional Physical Layer Specifications for 2-11 GHz, Apr. 1, 2003.*

* cited by examiner

*Primary Examiner*—Lester Kincaid
*Assistant Examiner*—Mehmood B Khan
(74) *Attorney, Agent, or Firm*—The Farrell Law Firm, LLP (57) ABSTRACT

Disclosed are a system for transmitting data using a band AMC in a broadband wireless orthogonal frequency multiplexing access system and a method thereof. In a broadband wireless communication system, a method for allocating data bursts to a mobile subscriber station according to channel state in a broadband wireless communication system, the method including transmitting allocation information to the mobile subscriber station, the allocation information including information about a sub frequency band containing the data bursts allocated to the mobile subscriber station and information about the number of band AMC subchannels allocated to the mobile subscriber station in the sub frequency band and receiving the data bursts from the mobile subscriber station according to the allocation information.

8 Claims, 10 Drawing Sheets

| Syntax | Size | Notes |
|---|---|---|
| MAP_IE () { | | |
| Type = 1 | 2 bits | Band AMC |
| DL/UL Indication | 1 bits | 0: DL, 1: UL |
| MSS ID | 16 bits | |
| Nep | 4 bits | Encoder packet size |
| No. Band | 2 bits | 00: 1 band, 01: 2 bands 10: TBD, 11: bit map bands |
| if (No. Band == 11 ){ | | |
| Band BITMAP | 12 bits | |
| }else { | | |
| for (i=0; i<No. Band; i++){ | | |
| Band index | 4 bits | Band selection. Range 0-11 |
| } | | |
| } | | |
| for (i=0; i<N_band; i++){ | | N_band is determined from No. Band |
| Nsch | 5 bits | |
| } | | |
| if(DL/UL Indication == 0) { | | |
| UL continue | 1 bits | 0: no UL Burst, 1: UL burst continues |
| if(UL continue) { | | |
| Reduced_MAP_IE | variable | |
| } | | |
| } | | |
| } | | |

| Syntax | Size | Notes |
|---|---|---|
| MAP_IE () { | | |
| Type = 1 | 2 bits | Band AMC |
| DL/UL indication | 1 bits | 0: DL, 1: UL |
| MSS ID | 16 bits | |
| Nep | 4 bits | Encoder packet size |
| No. Band | 2 bits | 00: 1 band, 01: 2 bands, 10: TBD, 11: bit map bands |
| if (No. Band == 11 ){ | | |
| Band BITMAP | 12 bits | |
| }else { | | |
| for (i=0; i<No. Band; ;i++){ | | |
| Band Index | 4 bits | Band selection. Range 0-11 |
| } | | |
| } | | |
| for (i=0; i<N_band; i++){ | | N_band is determined from No. Band |
| Nsch | 5 bits | |
| } | | |
| if(DL/UL indication == 0) { | | |
| UL continue | 1 bits | 0: no UL Burst, 1: UL burst continues |
| if(UL continue) { | | |
| Reduced_MAP_IE | variable | |
| } | | |
| } | | |
| } | | |

FIG.3

| Syntax | Size | Notes |
|---|---|---|
| Reduced_MAP_IE () { | | |
| Reduced Type = 1 | 1 bits | Band AMC |
| Nep | 4 bits | Encoder packet size |
| No. Band | 2 bits | 00: 1 band, 01: 2 bands, 10: TBD  11: bit map bands |
| if(No. Band == 11 ){ | | |
| Band BITMAP | | |
| }else { | 12 bits | |
| for (i=0; i< No. of Band; i++){ | | |
| Band Index | | |
| } | 4 bits | |
| } | | |
| for (i=0; i<N_band; i++){ | | |
| Nsch | 5 bits | N_band is determined from No. Band |
| } | | |
| } | | |

DATA TRANSMISSION SYSTEM IN BROADBAND WIRELESS ACCESS SYSTEM USING BAND AMC AND METHOD THEREOF

PRIORITY

This application claims priority to an application entitled "Data Transmission System in Broadband Wireless Access System Using Band AMC and Method Thereof" filed in the Korean Industrial Property Office on Mar. 12, 2004, and assigned Serial No. 2004-17097, the contents of which are hereby incorporated by reference.

BACKGROUND OF THE INVENTION

1. Field of the Invention

The present invention relates generally to a data transmission system in a wireless communication system and a method thereof, and more particularly to a system for transmitting data by applying a band AMC (Adaptive Modulation and Coding) in an OFDMA (Orthogonal Frequency Division Multiplexing Access) system and a method thereof.

2. Description of the Related Art

Typically, a wireless communication system is a system developed to be used in cases in which a fixed wire network cannot be connected to a terminal. The wireless communication system has been developed into a mobile communication system such as a cellular system. The cellular system connects a base station, which communicates with a terminal through a wireless channel, to a wire network. A representative cellular system is a cellular mobile communication system that uses a CDMA (Code Division Multiple Access) system.

Although the cellular system was developed to provide voice communications, systems that can provide diverse data services have now been proposed. Additionally, since the amount of data required by respective users is increasing, users now desire to transmit a larger amount of data at a higher speed. Accordingly, research has been made to support high speed data transfer in the cellular system that uses the CDMA system.

Meanwhile, in order to provide a large amount of data to users at a high speed, research into an OFDM (Orthogonal Frequency Division Multiplexing) system that is different from the CDMA system has actively been in progress, in order to commercialize a system that uses the OFDM system. Accordingly, the IEEE 802.16 standardization group of IEEE (Institute of Electrical and Electronics Engineers) is carrying out the establishment of the IEEE 802.16d standard for proving a broadband wireless Internet service with respect to a fixed terminal.

The OFDM system may be defined as a second-dimensional access method that combines the techniques of TDA (Time Division Access) and FDA (Frequency Division Access). In IEEE P802.16d/D3-2004, an OFDMA (Orthogonal Frequency Division Multiple Access) method is used in which the entire band is divided into subcarriers, some of these subcarriers are grouped into subchannels, and the respective subchannels are allocated to all users. Accordingly, all user terminals in the system use the subchannels composed of subcarriers broadly spread over the entire band, and in the system that uses the OFDMA system (hereinafter referred to as the 'OFDMA system'), each of user data is transmitted to corresponding user through a plurality d of subcarriers that constitute a specified subchannel.

Meanwhile, in the broadband OFDMA system, all users connected to a base station share and use common channels, and sections used by the respective users are allocated for each frame by the base station. Accordingly, the base station divides access information into uplink access information and downlink access information, and allocates the uplink access information and the downlink information to the front part of each frame to be broadcast to all users.

In the broadband OFDMA system, the access information that is transmitted for each frame includes information such as a modulation method, a coding rate, etc. A general frame structure will now be explained with reference to the accompanying drawings.

Figure 1:
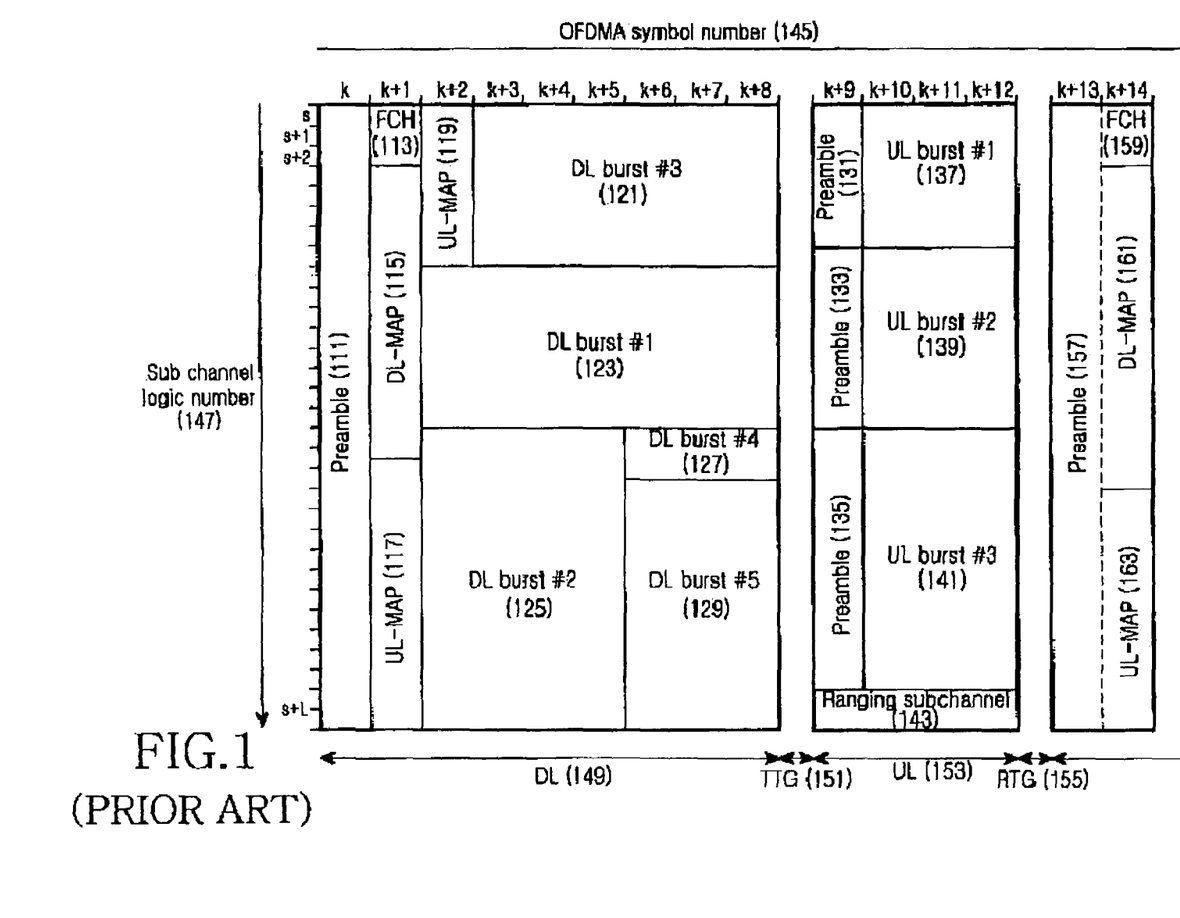
FIG. 1 illustrates the frame structure of uplinks and downlinks in a general broadband OFDMA system.

FIG. 1 is a view illustrating a frame structure including uplinks and downlinks in a general broadband OFDMA system. In FIG. 1, the vertical axis represents the numbers (S, S+1, S+2, . . . , S+L) 147 of various subchannels, and the horizontal axis, i.e., the time axis (t), represents the numbers 145 of OFDMA symbols.

Referring to FIG. 1, a frame is composed of a downlink (DL) 149 and an uplink (UL) 153 divided in time, and an OFDMA frame is composed of a plurality (for example, L) subchannels. This OFDMA system is a system having an object of obtaining a frequency diversity gain by dispersing the whole subcarriers used in the system and especially data subcarriers over the entire frequency band.

The downlink 149 includes a preamble 111, located in front, for synchronizing a transmitter-side terminal with a receiver-side base station, broadcast data information such as FCH (Frame Control Header) 113, DL_MAP 115 and UL_MAP 117, and downlink bursts 121, 123, 125, 127 and 129.

The uplink 153 includes preambles 131, 133 and 135, located in front of uplink bursts 137, 139 and 141, for synchronizing the transmitter-side terminal and the receiver-side base station, and a ranging subchannel 143 for adjusting a receiving power of the base station. The base station informs the terminal of information about positions and allocations of the uplink bursts 137, 139 and 141 and the downlink bursts 121, 123, 125, 127 and 129 through DL_MAP 115 and UL_MAP 117. The terminal is variably allocated with the subchannels in which the frequency and the symbol are combined for each frame through this information, and communicates with the base station. That is, the terminal receives and uses different subchannels, not fixed subchannels, for each frame.

Additionally, a conversion process from the downlink to the uplink is performed for a first TTG (Transmit/receive Transition Gap) 151, and a conversion process from the uplink to the downlink is performed for a second RTG (Receive/transmit Transition Gap) 155. After these conversions are processed, a preamble region is placed so that the terminal can obtain the system sync.

As described above, the frame is coded, modulated and then transmitted in accordance with the most accurate coding rate and transmission rate before it is transmitted through a wireless channel. For example, the channel state of the terminal is changed according to the cell position of the terminal. A terminal located in the center of the cell has a good channel state, and a high-efficiency modulation and a low coding rate are used, while a terminal located on the cell boundary has a poor channel state due to interference with adjacent base stations, and a low-efficiency modulation and a high coding rate are used, so that the reliability of data can be heightened.

However, since the conventional OFDMA system uses subchannels composed of subcarriers broadly spread over the whole band, it is impossible for a specified terminal to use a frequency band determined to have a good quality according to its channel state or to change the coding or modulation method according to the channel quality.

Additionally, the frame structure as described above makes it difficult to use a multiplexed coding method by which the coding and modulation being used is changed by frequency bands. This is because if the multiplexed coding method by frequency bands is used in the conventional system, which groups the subcarriers and uses the subcarrier groups as the subchannels, subfrequency bands obtained by dividing a frequency band are used as the subchannels.

Accordingly, the subchannels of the multiplexed coding method by frequency bands cannot be expressed by the above-described general frame structure and the MAP information elements, which define burst allocation elements, included therein, for informing the terminal of information about the coding and modulation.

SUMMARY OF THE INVENTION

Accordingly, the present invention has been designed to solve the above and other problems occurring in the prior art, and an object of the present invention is to provide a system and method for transmitting and receiving data at a high speed by applying a band AMC according to the channel state of a terminal in a broadband wireless access system.

Another object of the present invention is to provide a system and method for transmitting and receiving data for generating new MAP information elements in order to use a band AMC in a broadband wireless access system.

Still another object of the present invention is to provide a system and method for generating and interpreting new MAP information elements for reducing overhead for a burst allocation if bursts of uplinks or downlinks are simultaneously allocated in a broadband wireless access system that uses a band AMC.

In order to accomplish the above and other objects, there is provided a method for allocating data bursts to a mobile subscriber station according to channel state in a broadband wireless communication system, the method including transmitting allocation information to the mobile subscriber station, the allocation information including information about a sub frequency band containing the data bursts allocated to the mobile subscriber station and information about the number of band AMC subchannels allocated to the mobile subscriber station in the sub frequency band, and receiving the data bursts from the mobile subscriber station according to the allocation information.

In accordance with another aspect of the present invention, there is provided a method for receiving data bursts from a base station by a mobile subscriber station according to channel state in a broadband wireless communication system, the method including receiving allocation information which includes information about a sub frequency band containing the data bursts allocated to the mobile subscriber station and information about the number of band AMC subchannels allocated to the mobile subscriber station in the sub frequency band, and receiving the data bursts according to the allocation information.

In accordance with still another aspect of the present invention, there is provided a system for transmitting data bursts according to channel state in a broadband wireless communication system, the system including a base station for transmitting allocation information to a mobile subscriber station, the allocation information including information about a sub frequency band containing the data bursts to be received by the mobile subscriber station and information about band AMC subchannels representing positions of the data bursts in the sub frequency band, and the mobile subscriber station for receiving the data bursts from the base station based on the sub frequency band and the band AMC subchannels in the allocation information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, the same drawing reference numerals are used for the same elements even if in different drawings. Additionally, a detailed description of known functions and configurations incorporated herein will be omitted when it may obscure the subject matter of the present invention.

According to the present invention, in the case in which a base station (BS) and a subscriber station (SS) communicate with each other using a band AMC, the base station informs the subscriber station of the allocated frequency band and the coding method to be used. For this, new MAP information elements for the band AMC are defined. At the same time, a scheme for minimizing overhead generated during the transfer of the newly generated MAP information element should also be taken into consideration. Accordingly, in the embodiments of the present invention, a form of MAP information elements having low overhead that is required in using the band AMC in the broadband wireless access system is newly defined, and a method for generating and interpreting such MAP information elements will be explained.

First, the frame structure that includes newly generated MAP information elements according to an embodiment of the present invention will be explained.

Figure 2:
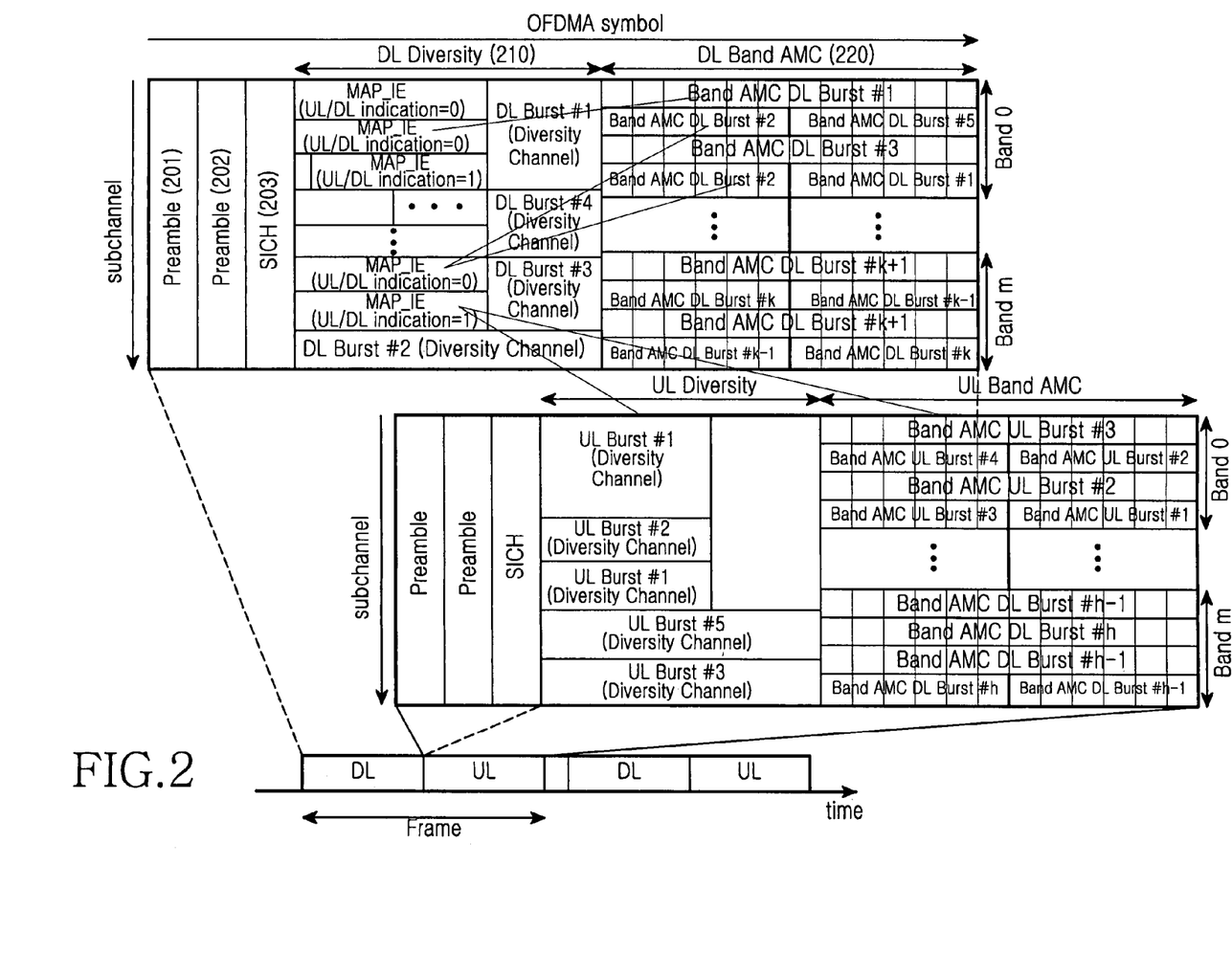
FIG. 2 illustrates the frame structure of uplinks and downlinks in a broadband OFDMA system that uses a band AMC according to an embodiment of the present invention.

FIG. 2 is a view illustrating the frame structure of uplinks and downlinks in a broadband OFDMA system that uses a band AMC according to an embodiment of the present invention. In FIG. 2, the number of downlink band AMC subchannels is k+1 and the number of uplink band AMC subchannels is h. The respective band AMC subchannels are indicated as Band AMC DL Burst #k+1 and Band AMC UL Burst #h. The horizontal axis represents OFDMA symbols, and the vertical axis represents subchannels.

Referring to FIG. 2, in a frame, one frequency band is divided into m+1 sub frequency bands Band 0, Band 1, Band 2, ..., Band m on the vertical axis, and respective OFDM symbols are divided in the form of bins on the vertical axis, i.e., the time (t) axis. Here, the term 'bin' means an allocation unit used in a band AMC channel formed by grouping a specified number of subcarriers.

Specifically, a frame is composed of a downlink (DL) and an uplink (UL). Preambles 201 and 202 are included in front OFDMA symbol regions of the respective links, and a system information channel (hereinafter referred to as an 'SICH') 203 is included in the next OFDMA symbol region. The following broadcasting control region is divided into a downlink (DL) diversity region 210 that includes uplink or downlink MAP information elements and a downlink (DL) band AMC region 220 that includes band AMC DL bursts.

The downlink diversity region 210 includes MAP information elements MAP_IE for designating positions of the respective DL/UL bursts transmitted through the diversity subchannels and multiple AMC subchannels, and the corresponding terminals. Unlike the conventional system, in the frame structure, the downlink MAP information elements and the uplink MAP information elements are not separately arranged, but are mixed together. In the frame structure of FIG. 2, the uplink and downlink MAP information elements have the same type in a data format. In order to discriminate the uplink and downlink information elements from each other, the respective information element has a UL/DL indication field, and according to this value, it can be discriminated whether the corresponding MAP element is for the uplink or the downlink. Additionally, in the frame structure of FIG. 2, the MAP information elements for the diversity subchannels and the MAP information elements for the AMC channels may mixed together, and in order to discriminate the MAP information elements from each other, a type field is included in the respective information element. A detailed explanation thereof will be made below.

The base station variably allocates bins located in the sub frequency band that shows the best channel state among the sub frequency bands to the corresponding terminal, and broadcasts the allocated position through a broadcasting control region for the transmission of the MAP information elements of the frame using the MAP information type proposed according to the present invention. Here, the number of bins allocated is indicated in a value of Nsch represents the number of subchannels of band AMC. For example, in the case of using 6 bins as one band AMC subchannel, 6, 12 and 24 bins are allocated if the set value is 1, 2 and 4, respectively.

For example, as illustrated in FIG. 2, the first band AMC DL burst (Band AMC DL Burst #1) is transmitted through a band AMC subchannels composed of 12 bins and 6 bins, the third band AMC DL burst (Band AMC DL Burst #3) is transmitted through a band AMC subchannels composed of 12 bins, and the second band AMC DL burst (Band AMC DL Burst #2) is transmitted through two band AMC subchannels composed of 6 bins. The fifth AMC DL burst (Band AMC DL Burst #5) is transmitted through one Band AMC subchannels composed of 6 bins, and the fourth band AMC DL burst (Band AMC DL Burst #4) would be transmitted through one of the subbands not illustrated in FIG. 2.

The structure of the uplink and downlink MAP information elements DL_MAP IE and UP_MAP IE for designating the allocated bins in the frame structure as described above will be explained in more detail.

Figure 3:
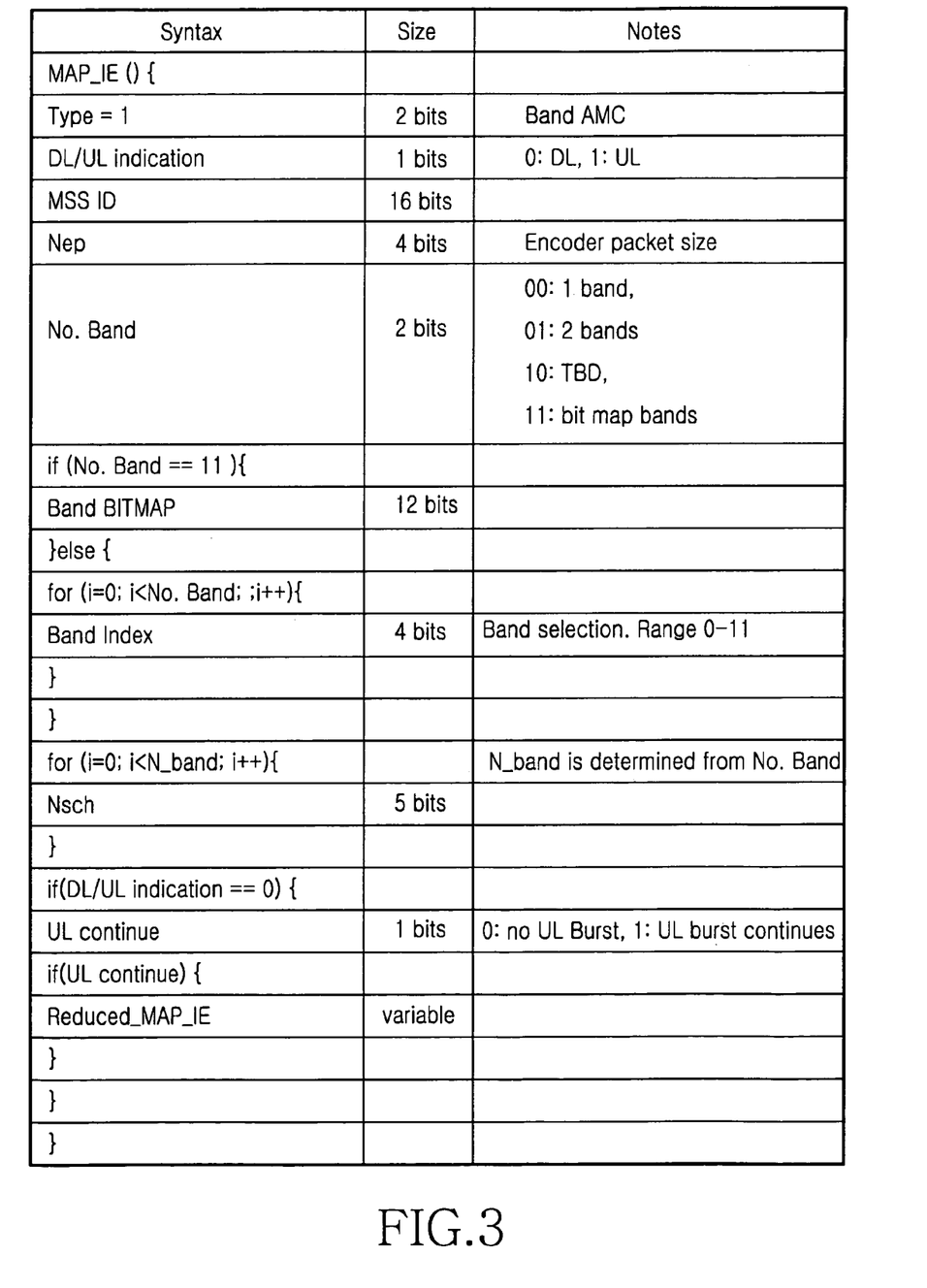
FIG. 3 illustrates the structure of MAP information elements for a band AMC according to an embodiment of the present invention.

FIG. 3 is a view illustrating the structure of MAP information elements for a band AMC according to an embodiment of the present invention.

As illustrated in FIG. 3, in the MAP information element format for use in the band AMC, a two-bit "Type=1" field indicates the type of the MAP information element. Here, although the type field is constructed so that it can support four types (of diversity, band AMC, circuit stream and safety) in all, the detailed explanation of the respective types is not related to the gist of the present invention, and thus will be omitted. The MAP information element is a MAP information element for the terminal that operates in the band AMC type, and is set to a value of '1'.

A one-bit "DL/UL indication" field is a field that indicates an identifier for discriminating the downlink and the uplink from each other. This field has a value of '0' if the corresponding MAP information element corresponds to the band AMC subchannel allocation for the downlink, and has a value of '1' if the corresponding MAP information elements corresponds to the subchannel allocation for the uplink. Here, unlike the existing IEEE 802.16 system, different types of MAP information element are not used with respect to the uplink and downlink bursts, but a common type of MAP information element is used as needed.

A 16-bit "MSS ID" field indicates the ID of the terminal (Mobile Subscriber Station) that will receive the corresponding MAP information element. The respective terminal is allocated with one MSS ID during its access to the base station, and thus the terminal that will receive the respective MAP information element is displayed using the MSS ID. The terminal designated as a receiver of the MAP information element through the MSS ID value finds the position of the subchannel through which it will transmit/receive data to/from the base station by interpreting the contents of the respective variables included in the received MAP information element, and transmits and receives the data through the corresponding subchannel at a determined time.

A four-bit "Nep" field indicates the size of an encoder packet of the UL burst or DL burst that the terminal will transmit or receive by the corresponding MAP information element.

A two-bit "No. Band" field indicates the number of frequency bands allocated for data bursts designated by the corresponding MAP information element. If the value of No. Band is '00', it indicates that one band is allocated for the data bursts. If the value of No. Band is '01', it indicates that two bands are allocated for the data bursts. If the value of No. Band is '10', it indicates that reserved values remain, to be determined for future use. If the value of No. Band is '11', it indicates that the number of bands to be used and the position information are displayed in the form of a bitmap of 12 bits that follow the term No. Band.

A 12-bit "Band BITMAP" field is a field that is included if the field No. Band has the value of '11'. The respective bits of the Band BITMAP means $0^{th} \sim 12^{th}$ bands of the Band BITMAP, respectively. The corresponding band has a value of '1' when it is used for the data bursts, while it has a value of '0' if it is not used. By contrast, if No. Band has the value of '00' or '01', a four-bit "Band Index" that follows No. Band appears repeatedly as many times as the number of bands that is indicated by No. Band.

A following 5-bit "Nsch" field indicates the size of the sub channel in the band designated for the position of the data bursts that the terminal should receive by the respective band information included in the downlink MAP information element. That is, the "Nsch" field indicates the size of the subchannel of the respective band designated through the Band BITMAP or BAND Index having a size of four bits after No. Band.

A one-bit "UL burst continue" field is set to '1' when the reduced uplink MAP information element for the same terminal appears just after the downlink access information element. Here, if the UL burst continue is set to '0', it indicates that no UL burst exists, while if it is set to '1', it indicates that UL and DL are simultaneously used. In this case, it includes "Reduced_MAP_IE" having variable bits. This reduced uplink MAP information element is illustrated in FIG. 4.

Figure 4:
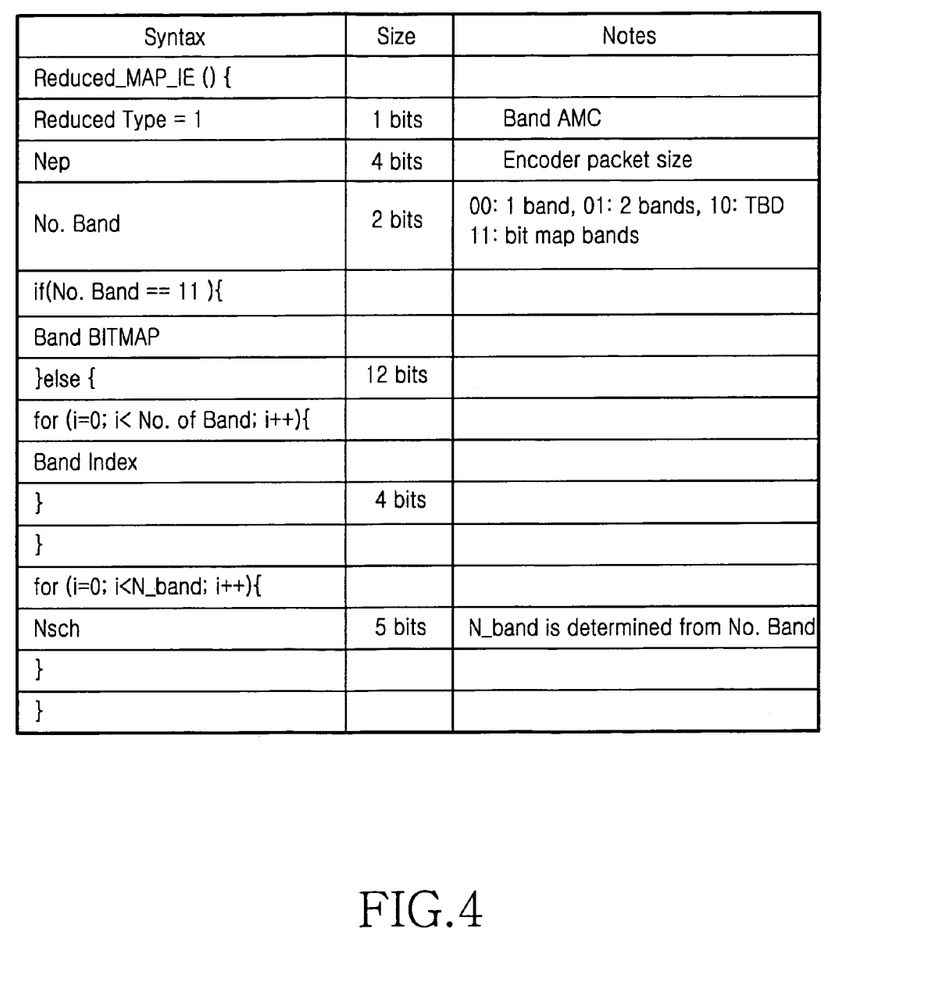
FIG. 4 illustrates the structure of reduced MAP information elements for a band AMC according to an embodiment of the present invention.

Referring to FIG. 4, the reduced uplink MAP information element is included in the downlink MAP information element having MSS ID, and in order to reduce the overhead, the field for indicating the DL/UL indication and the MSS ID field are omitted in comparison to the normal MAP information element. Additionally, the reduced MAP information element has a one-bit "Reduced Type" field instead of the Type field, and is set to '1'. Other values are set in the same manner as the method for constructing the MAP information that is not reduced.

Figure 5A:
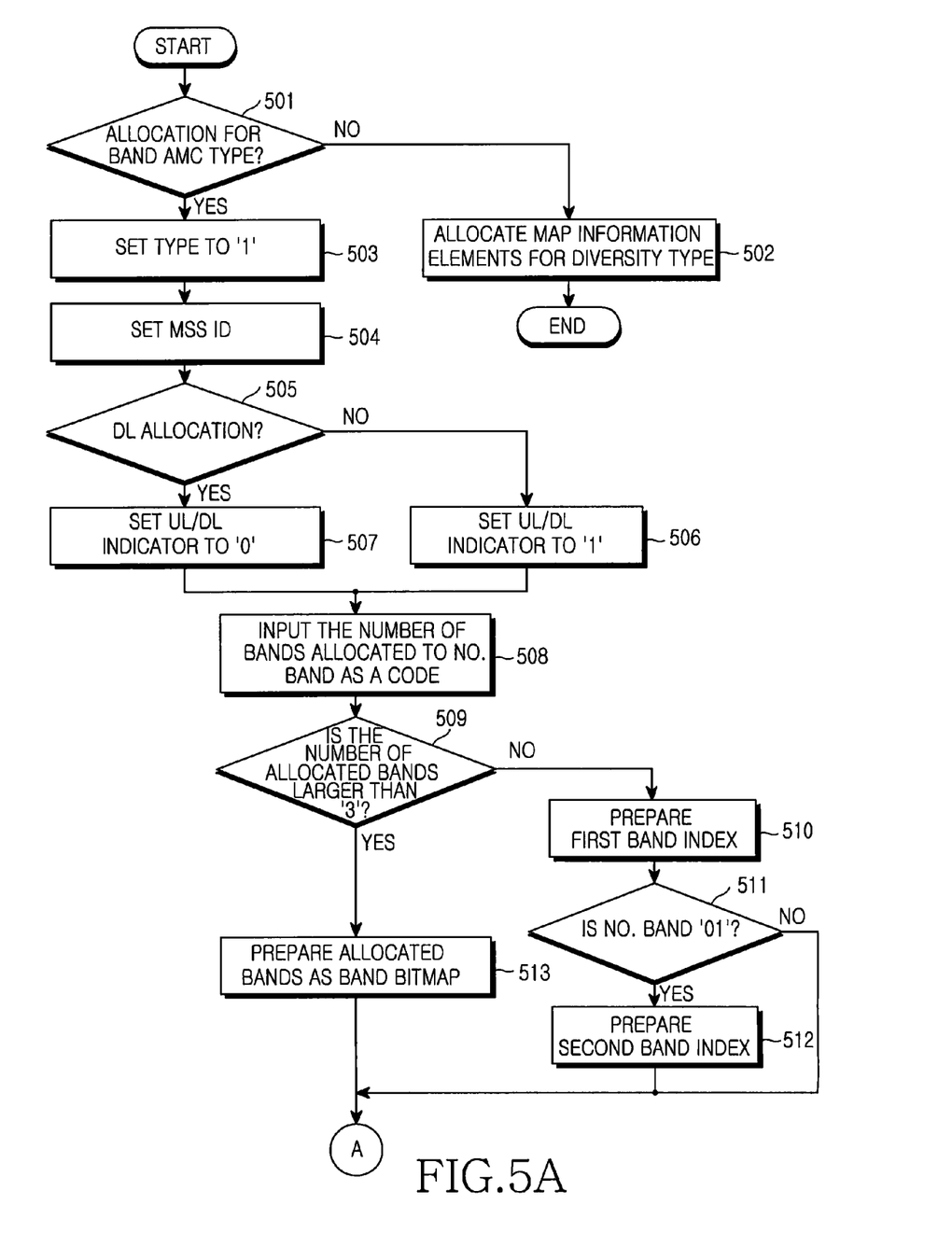
FIGS. 5A to 5B are flowcharts illustrating the operation of generating MAP information elements in a broadband OFDMA system that uses a band AMC according to an embodiment of the present invention.
Figure 5B:
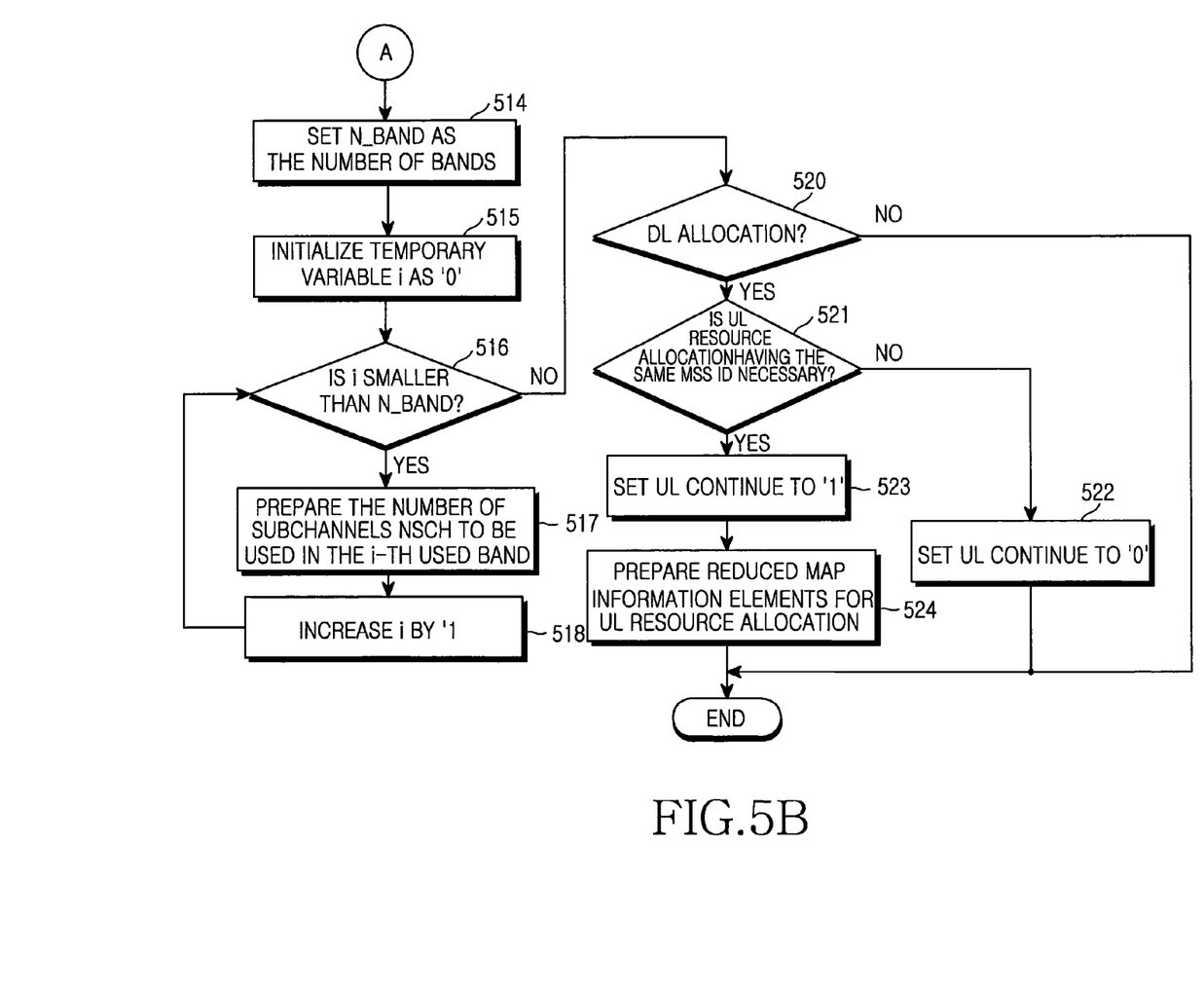

The process of generating the MAP information elements having the above-described structure will now be explained FIGS. 5A to 5B are flowcharts illustrating the operation of generating MAP information elements according to an embodiment of the present invention. Here, since the MAP information elements are information for the base station's informing the terminal of the frequency allocated to the terminal and the coding method to be used, the process illustrated in FIG. 5 will be explained from the position of the base station.

Referring to FIG. 5, the base station determines whether the band AMC type is allocated at step 501. If the band AMC type is not allocated, the base station performs a specified process of allocating the MAP information elements for the diversity type at step 502, and then terminates the process. By contrast, if the band AMC type is allocated at step 501, the base station sets the message type to '1' at step 503.

The base station sets the ID of the terminal that will receive the corresponding MAP information element in the MSS ID field and sets the size of the encoder packet of the uplink burst or the downlink burst that the terminal transmits and receives in the Nep field at step 504.

Then, the base station confirms whether the allocation is made for the downlink DL or the uplink UL at step 505. If the allocation is the Band AMC subchannel allocation for the uplink UL as a result of confirmation, the base station sets the UL/DL indicator field to '1' at step 506, and then moves to step 508. By contrast, if the allocation is the Band AMC subchannel allocation for the downlink DL, the base station sets the UL/DL indicator field to '0' at step 507.

The base station inputs the number of bands allocated to No. Band field as a code at step 508. Then, the base station determines whether the number of bands being allocated exceeds 3 at step 509. At this time, if the number of bands being allocated is less than 3, the base station prepares the first band index at step 510, and confirms whether No. Band is set to '01' at step 515. If the set value is not '01', the base station proceeds to step 514, while if the set value is '01', it prepares the second band index at step 512. By contrast, if the number of bands is more than 3 as a result of confirmation at step 509, the base station prepares the allocated band as Band BITMAP at step 513.

The base station sets the number of bands to the N_band value determined by the value set in the No. Band at step 514, and initializes a temporary variable i as '0' at step 515. The base station determines whether i is smaller than N_band at step 516. At this time, since i is set to '0' at step 515, i is smaller than N_band. In this case, the base station prepares the number Nsch of band AMC subchannels to be used in the i-th used band at step 517, increases i by '1' at step 518, and then proceeds to step 516 to repeat the above-described processes.

If i becomes larger than N-band after the above-described repeated processes, the base station proceeds to step 520 to determine whether the allocation is made for the uplink or the downlink at step 520. If the allocation is made for the uplink, the base station terminates its operation, while otherwise, it determines whether an uplink resource allocation having the same MSS ID is required at step 521. If the uplink resource allocation having the same MSS ID is not required at step 521, the base station sets the UL continue field to '0' at step 522 since there is no uplink burst. By contrast, if the uplink resource allocation having the same MSS ID is required, the base station sets the UL continue field to '1' at step 523 since there are continuous uplink bursts, and prepares the reduced MAP information elements for the uplink resource allocation at step 524 to terminate the following operation.

If the UL resource allocation having the same MSS ID is required as at step 521 during the generation of the MAP information element through the above-described operation, the base station prepares the reduced MAP information element. The process of generating the reduced MAP information elements will be explained in more detail with reference to the accompanying drawings.

Figure 6:
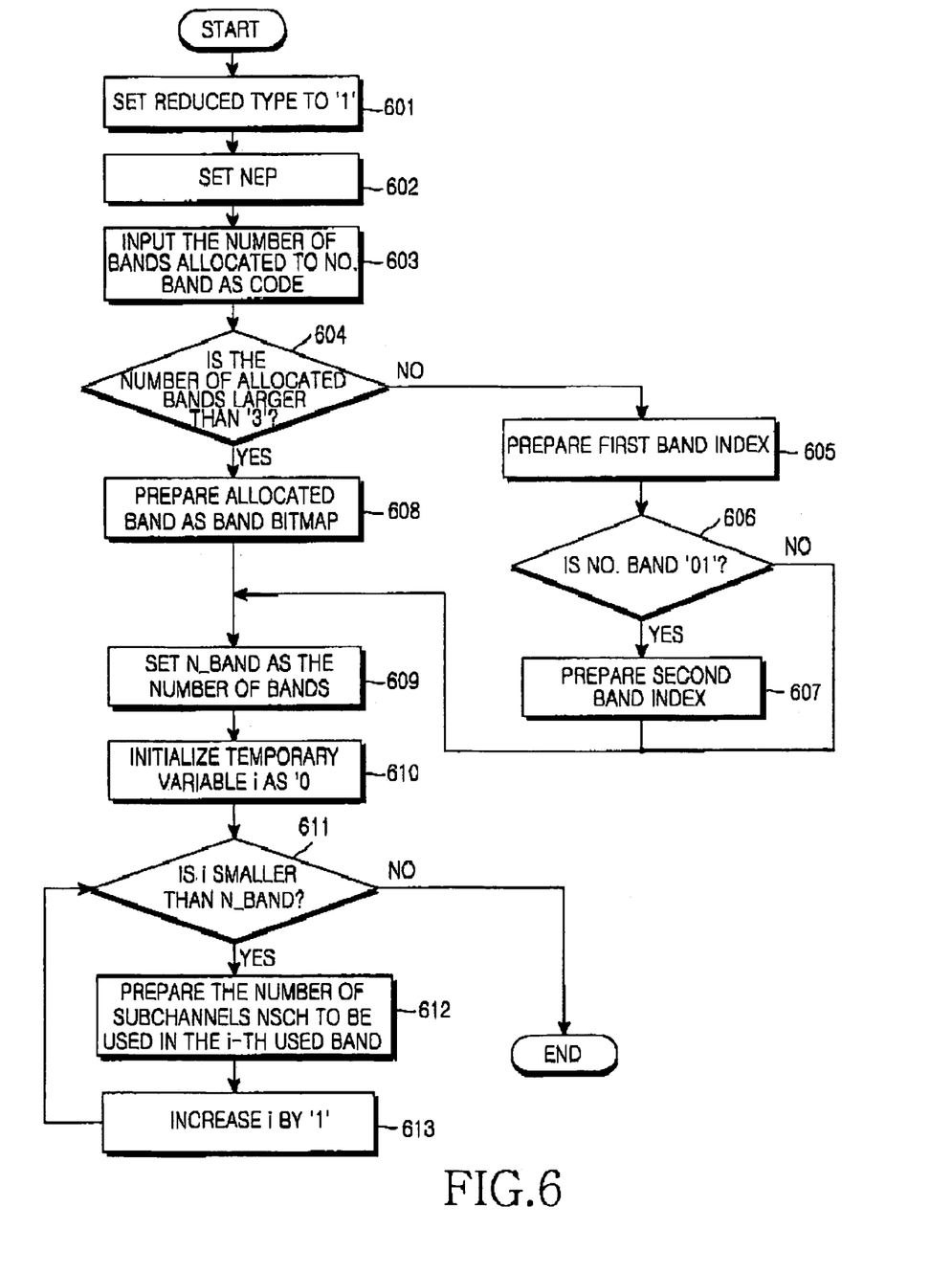
FIG. 6 is a flowchart illustrating a process of generating reduced MAP information elements in a broadband OFDMA system that uses a band AMC according to an embodiment of the present invention.

FIG. 6 is a flowchart illustrating the process of generating the reduced MAP information elements according to an embodiment of the present invention.

Referring to FIG. 6, the base station sets the Reduced Type to '1' in order to indicate that the reduced MAP information elements are prepared at step 601, and then sets the size of the encoder packet of the uplink burst or the downlink burst that the terminal transmits and receives in the Nep field at step 602.

The base station inputs the number of bands being allocated to the No. Band as the code at step 603, and determines whether the number of bands being allocated is more than '3' at step 604. At this time, if the number of bands being allocated is less than '3', the base station prepares the first Band Index at step 605, and confirms whether the No. Band is set to '01' at step 606. At this time, if the set value is not '01', the base station proceeds to step 609, while if the set value is '01', the base station prepares the second Band Index at step 607. By contrast, if the number of bands is more than '3' at step 604, the base station prepares the allocated bands by Band BITMAP at step 608.

The base station sets the number of bands to the N_band value determined by the value set in No. Band at step 609, and initializes the temporary variable i as '0' at step 610. The base station determines whether i is smaller than N_band at step 611. At this time, since i is set to '0' at step 610, i is smaller than N_band. In this case, the base station prepares the number Nsch of band AMC subchannels to be used in the i-th used band at step 612, increases i by '1' at step 613, and then proceeds to step 611 to repeat the above-described processes. If i becomes larger than N-band at step 611 as i increases through the above-described repeated processes, the base station terminates its operation.

Next, the process of receiving and interpreting the generated MAP information elements that is performed by the terminal will be explained with reference to the accompanying drawings.

Figure 7A:
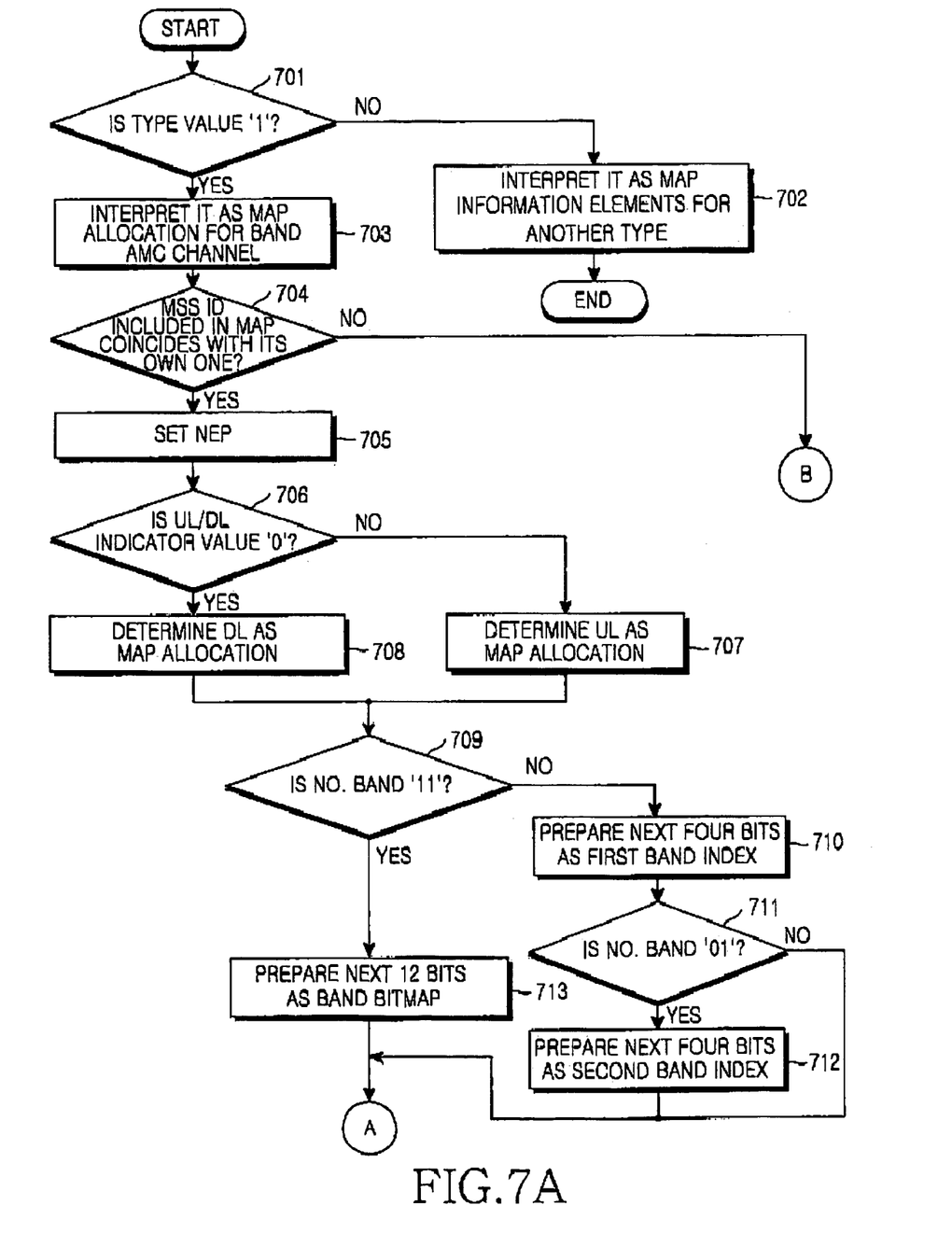
FIGS. 7A to 7B are flowcharts illustrating a process of interpreting MAP information elements in a broadband OFDMA system that uses a band AMC according to an embodiment of the present invention.
Figure 7B:
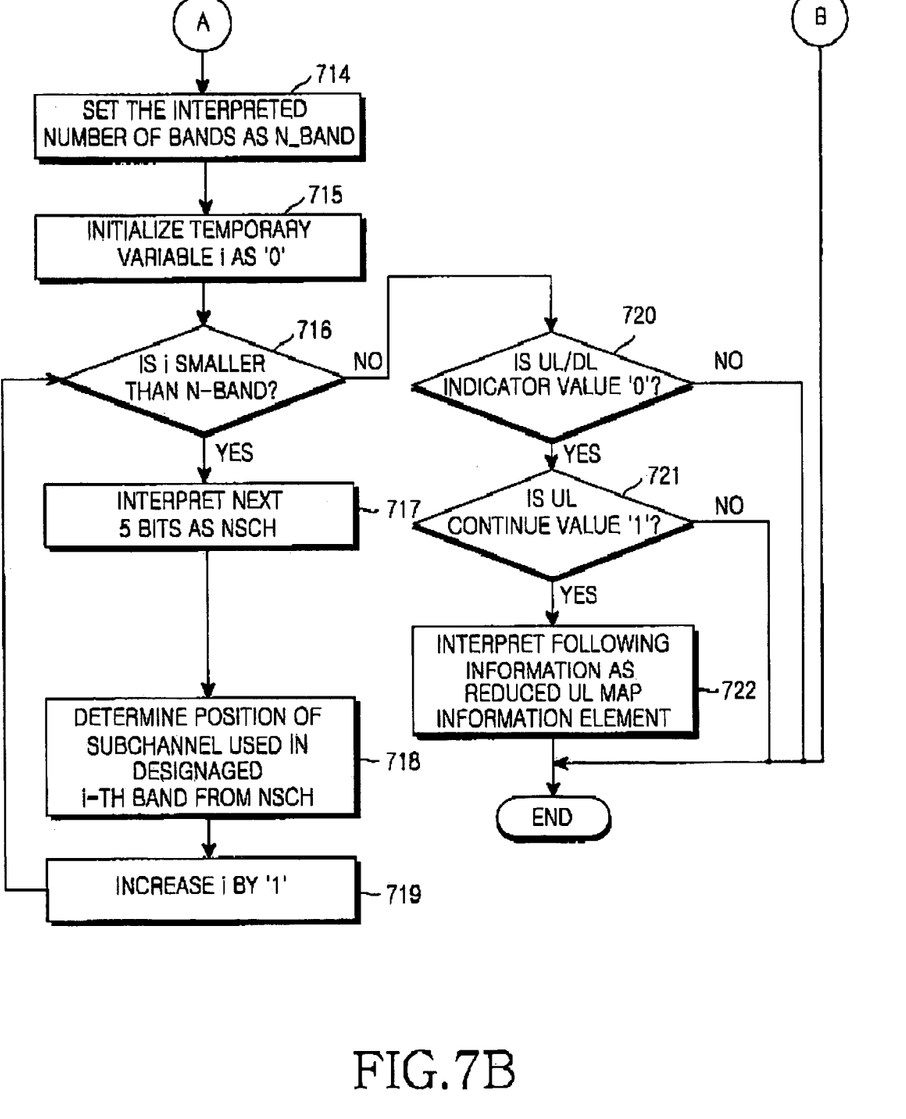

FIGS. 7A to 7B are flowcharts illustrating the process of interpreting the generated MAP information elements according to an embodiment of the present invention.

Referring to FIGS. 7A and 7B, the terminal confirms the Type field value by interpreting the received MAP information elements at step 701. At this time, if the Type field value is not set to '1', the terminal performs the process of interpreting the MAP information elements for other Types at step 702, and then terminates its operation. By contrast, if the Type field value is set to '1', the terminal interprets that the MAP allocation is made for the Band AMC channel at step 703.

The terminal determines whether the MSS ID included in the received MAP information elements coincides with its own MSS ID allocated during the initial setting process at step 704. If it does not coincide with its own MSS ID, the terminal terminates its operation, while if it coincides with its own MSS ID, the terminal sets the size of the encoder packet of the downlink bursts or the uplink bursts that the terminal transmits and receives at step 705.

The terminal confirms the value of UL/DL indicator at step 706. If the value is set to '1', the terminal recognizes this as the uplink MAP allocation at step 707, and proceeds to step 709. By contrast, if the value is set to '0', the terminal recognizes this as the downlink MAP allocation at step 708, and then proceeds to step 709.

The terminal confirms whether No. Band is '11' at step 709. If it is not '11', the terminal interprets the following four bits as the first Band Index at step 710, and determines again whether No. Band is '01' at step 711. If it is not '01', the terminal proceeds to step 714, while if it is '01', the terminal interprets the following four bits as the second Band Index. By contrast, if No. Band is set to '11' as a result of confirmation at step 709, the terminal interprets the following 12 bits in the form of a Band BITMAP at step 713.

The terminal sets the number of interpreted bands to N_band at step 714, and initializes the temporary variable i as '0' at step 715. Then, the terminal determines whether i is smaller than N_band at step 716. At this time, since i is initialized at step 715, it is smaller than N_band. Accordingly, the terminal interprets the following 5 bits as Nsch at step 717, and determines the position of the subchannel used in the i-th band designated at step 718 from Nsch. Then, the terminal increases i by '1' at step 719, and then proceeds again to step 716 to repeat the above-described operation. If i becomes larger than N_band after performing the repeated processed, the terminal proceeds to step 720.

The terminal determines whether the UL/DL indicator value is '0' at step 720. If the value is not '0', the terminal terminates its operation, while if the value is '1', the terminal determines whether the UL continue value is '1' at step 721. If the UL continue value is '1', the terminal interprets the following information as the reduced UL MAP information elements at step 722. By contrast, if the UL continue value is not '1' at step 721, the terminal terminates its operation.

Figure 8:
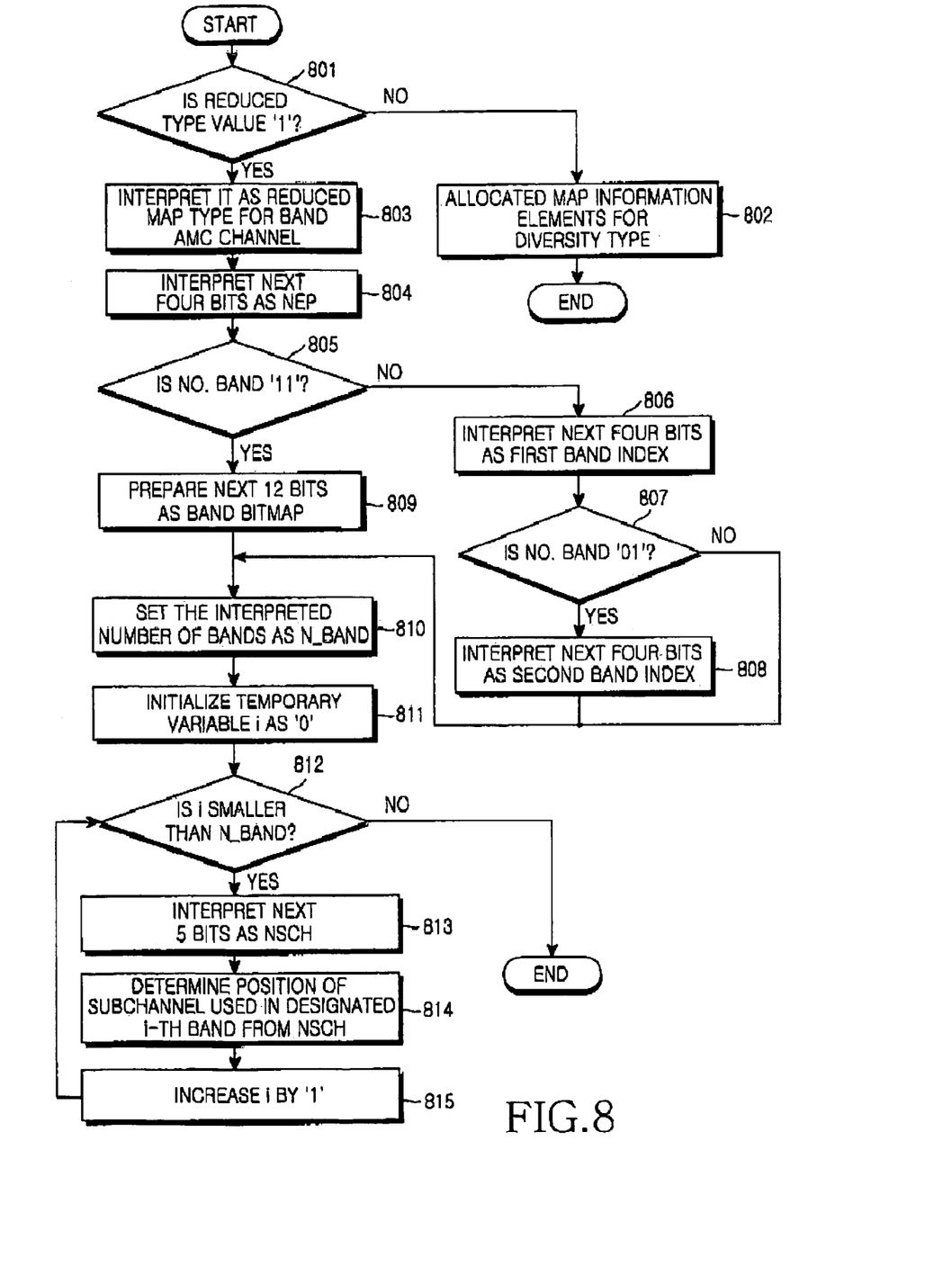
FIG. 8 is a flowchart illustrating a process of interpreting reduced MAP information elements in a broadband OFDMA system that uses a band AMC according to an embodiment of the present invention.

FIG. 8 is a flowchart illustrating the process of interpreting reduced MAP information elements according to an embodiment of the present invention.

Referring to FIG. 8, the terminal determines whether the Reduced Type included in the reduced MAP information elements is set to '1' at step 801. If it is not '1', the terminal performs the interpreting of the MAP information elements for the diversity channel at step 802, and terminates its operation. By contrast, if it is set to '1', the terminal interprets this as the reduced MAP type for the Band AMC channel at step 803, and then interprets the following four bits as Nep at step 804.

The terminal confirms whether No. Band is set to '11' at step 805. At this time, if the set value is not '11', the terminal interprets the following four bits as the first Band Index, and then confirms whether No. Band is '01' at step 807. If No. Band is not '01', the terminal proceeds to step 810, while if No. Band is '01', the terminal interprets the following four bits as the second Band Index at step 808.

If No. Band is '11' at step 805, the terminal interprets the 12 bits as the Band BITMAP at step 809, and then sets the number of bands interpreted at step 810 to N_band. Then, the terminal initializes the temporary variable i as '0' at step 811. The terminal sets the number of interpreted bands to N_band, and initializes the temporary variable i to '0' at step 811. Then, the terminal determines whether i is smaller than N_band at step 812. At this time, since i is initialized at step 811, it is smaller than N_band. Accordingly, the terminal interprets the following five bits as Nsch at step 813, and determines the position of the subchannel used in the i-th band designated at step 814 from Nsch. Then, the terminal increases i by '1' at step 815, and then proceeds again to step 812 to repeat the above-described operation. If i becomes larger than N_band after performing the above-described repeated operation, the terminal terminates its operation.

As described above, the present invention can construct an efficient MAP message for allocating frequency bands, coding and modulation methods by terminals by newly generating and interpreting MAP information elements required for using the band AMC in a broadband wireless access system.

Additionally, by using a common type in order to represent MAP information of uplink and downlink bursts, it is possible to construct the MAP information elements for indicating the uplink and downlink burst information as one, and thus the system overhead used for commonly recognizing the MAP information elements can be reduced.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting data bursts to a mobile subscriber station by a base station in a broadband wireless communication system, the method comprising the steps of:

transmitting a MAP information element (IE) to a mobile subscriber station; and transmitting data bursts, allocated to the mobile subscriber station, to the mobile subscriber station according to the MAP IE, wherein the MAP IF includes a type field indicating that a type of the MAP IF is a band Adaptive Modulation and Coding (AMC) type, a number of bands field indicating the number of bands allocated for the mobile subscriber station, a Band BITMAP field which is included when the number of band fields indicates a first value, and at least one band index field which is included when the number of bands field indicates a second value different from the first value, each of the at least one band index field indicating band index mapping to each of the number of bands allocated to the mobile subscriber station, and further wherein the Band BITMAP field includes m bits that are mapped to m bands, respectively, and indicates whether the m bands are allocated to the mobile subscriber station, respectively, and still further wherein a specific band includes n bins that comprise p subcarriers, and each of m, n and p is an integer equal to or greater than 1.

2. The method as claimed in claim 1, wherein the MAP IE includes an Identifier (ID) field for indicating an ID of the mobile subscriber station.

3. A method for receiving data bursts from a base station by a mobile subscriber station in a broadband wireless communication system, the method comprising the steps of:

receiving a MAP information element (IE) from the base station; and receiving data bursts allocated to the mobile subscriber station according to the MAP IE, wherein the MAP IE includes a type field indicating that a type of the MAP LB is a band Adaptive Modulation and Coding (AMC) type, a number of bands field indicating the number of bands allocated for the mobile subscriber station, a Band BITMAP field which is included when the number of bands field indicates a first value, and at least one band index field which is included when the number of bands field indicates a second value different from the first value, each of the at least one band index field indicating band index mapping to each of the number of bands allocated to the mobile subscriber station, and further wherein the Band BITMAP field includes m bits that are mapped to m bands, respectively, and indicates whether the m bands are allocated to the mobile subscriber station, respectively, and still further wherein a specific band includes n bins that comprise p subcarriers, and each of m, n and p is an integer equal to or greater than 1.

4. The method as claimed in claim 3, wherein the MAP IE includes an Identifier (ID) field for indicating an ID of the mobile subscriber station.

5. A system for transmitting data bursts in a broadband wireless communication system, comprising:

a mobile subscriber station; and a base station for transmitting a MAP information element (IE) to the mobile subscriber station, and for transmitting data bursts allocated to the mobile subscriber station, to the mobile subscriber station according to the allocation information, wherein the MAP IE includes a type field indicating that a type of the MAP IE is a band Adaptive Modulation and Coding (AMC) type, a number of bands field indicating the number of bands allocated for the mobile subscriber station, a Band BITMAP field which is included when the number of bands field indicates a first value, and at least one band index field which is included when the number of bands field indicates a second value different from the first value, each of the at least one band index field indicating band index mapping to each of the number of bands allocated to the mobile subscriber station, and further wherein the Band BITMAP field includes m hits that are mapped to m bands, respectively, and indicates whether the m bands are allocated to the mobile subscriber station, respectively, and still further wherein a specific band includes n bins that comprise p subcarriers, and each of m, n and p is an integer equal to or greater than 1.

6. The system as claimed in claim 5, wherein the MAP IE includes an Identifier (ID) field for indicating an ID of the mobile subscriber station.

7. A system for receiving data bursts in a broadband wireless communication system, comprising:

a base station; and a mobile subscriber station for receiving a MAP information element (IE) from the base station, and receiving data bursts allocated to the mobile subscriber station according to the MAP IE, wherein the MAP IE includes a type field indicating that a type of the MAP IE is a band Adaptive Modulation and Coding (AMC) type, a number of bands field indicating the number of bands allocated for the mobile subscriber station, a Band BITMAP field which is included when the number of bands field indicates a first value, and at least one band index field which is included when the number of bands field indicates a second value different from the first value, each of the at least one band index field indicating band index mapping to each of the number of bands allocated to the mobile subscriber station, and further wherein the Band BITMAP field includes m bits that are mapped to m bands, respectively, and indicates whether m bands are allocated to the mobile subscriber station, respectively, and still further wherein a specific band includes n bins that comprises p subcarriers, and each of m, n and p is an integer equal to or greater than 1.

8. The system as claimed in claim 7, wherein the MAP IE includes an IDentifier (ID) field for indicating an ID of the mobile subscriber station.

\* \* \* \* \*

UNITED STATES PATENT AND TRADEMARK OFFICE
CERTIFICATE OF CORRECTION

PATENT NO. : 7,596,114 B2  Page 1 of 1
APPLICATION NO. : 11/077854
DATED : September 29, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Fourteenth Day of December, 2010

David J. Kappos
*Director of the United States Patent and Trademark Office*